United States Patent
Van Huis

[11] 3,903,851
[45] Sept. 9, 1975

[54] CONTAINERIZED PRODUCTION OF POULTRY

[75] Inventor: Robert L. Van Huis, Zeeland, Mich.

[73] Assignee: U.S. Industries, Inc., New York, N.Y.

[22] Filed: May 23, 1969

[21] Appl. No.: 827,220

Related U.S. Application Data

[63] Continuation-in-part of Ser. No. 786,177, Dec. 23, 1968, Pat. No. 3,593,689.

[52] U.S. Cl. .................................................. 119/18
[51] Int. Cl.² ......................................... A01K 31/00
[58] Field of Search ........................... 119/17, 18, 48

[56] References Cited
UNITED STATES PATENTS

| | | | |
|---|---|---|---|
| 1,973,530 | 9/1934 | Hart | 119/18 X |
| 3,292,581 | 12/1966 | Van Nest | 119/17 |
| 3,396,702 | 8/1968 | Trussell | 119/17 |
| 3,465,722 | 9/1969 | Duff | 119/18 |
| 3,478,721 | 11/1969 | Maxfield | 119/18 |

Primary Examiner—Hugh R. Chamblee
Attorney, Agent, or Firm—Price, Heneveld, Huizenga & Cooper

[57] ABSTRACT

A method for the containerized production of poultry wherein within the same cage poultry is transported from the hatchery, raised from a chick to a grown bird (either layers or broilers) and transported to the processor or egg producing farm. Preferably the cage utilized in the process has two adjacent feeding sides formed by a mesh of two different sized openings. The cage is rotated 90° when the chicks reach a certain age, so as to retain the chicks for their entire growth, allowing the cage to be shipped with and without birds from hatchery to grower to processor, and back to the hatchery, respectively. An adjustable feed trough side wall extension allows the trough to be enlarged as the birds grow.

8 Claims, 11 Drawing Figures

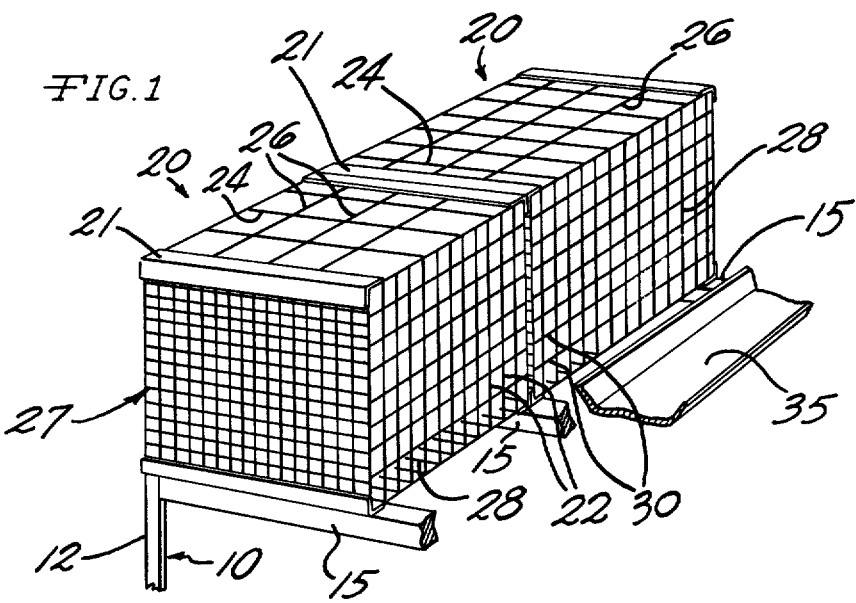
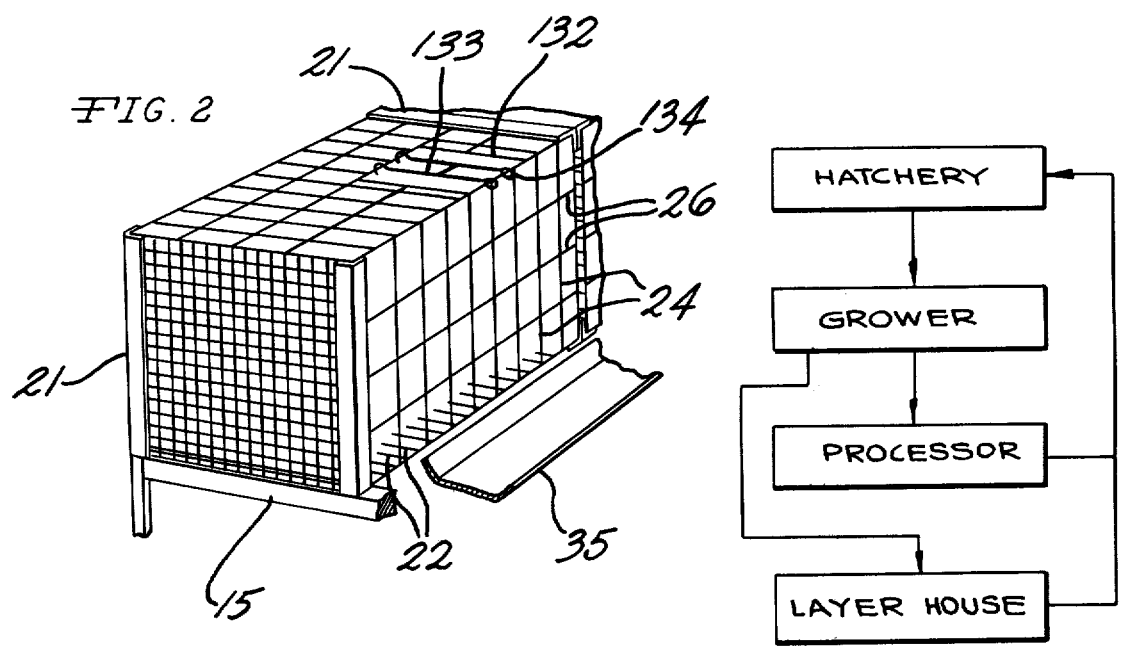
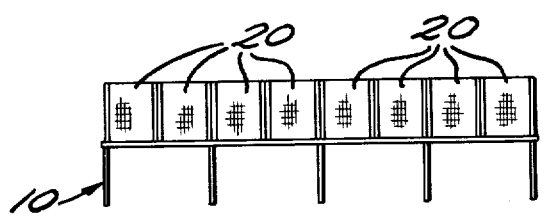

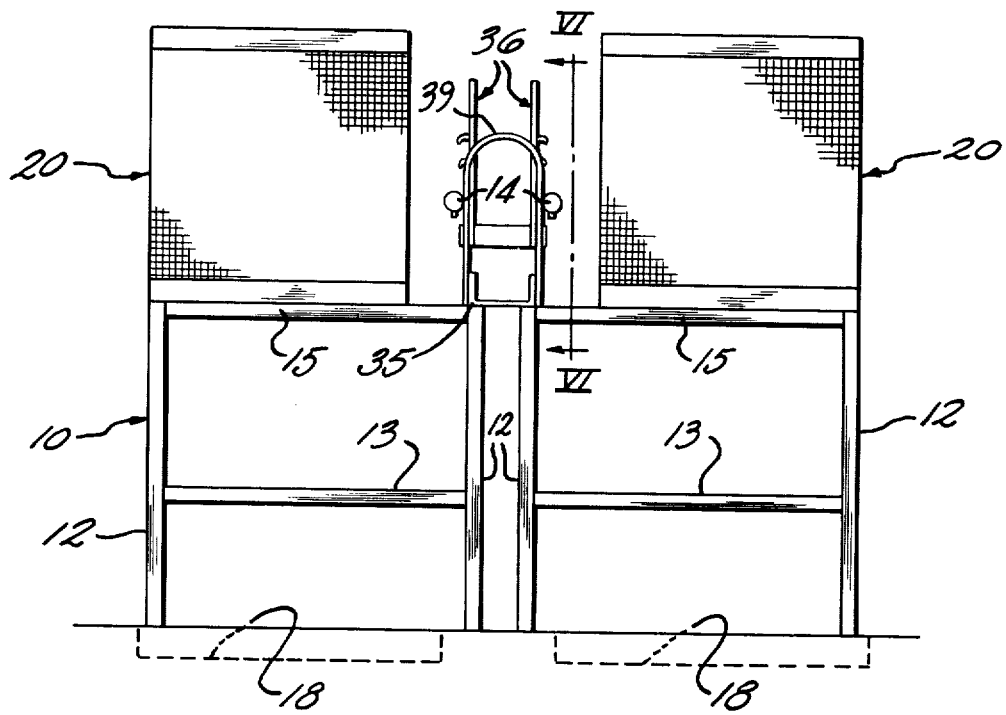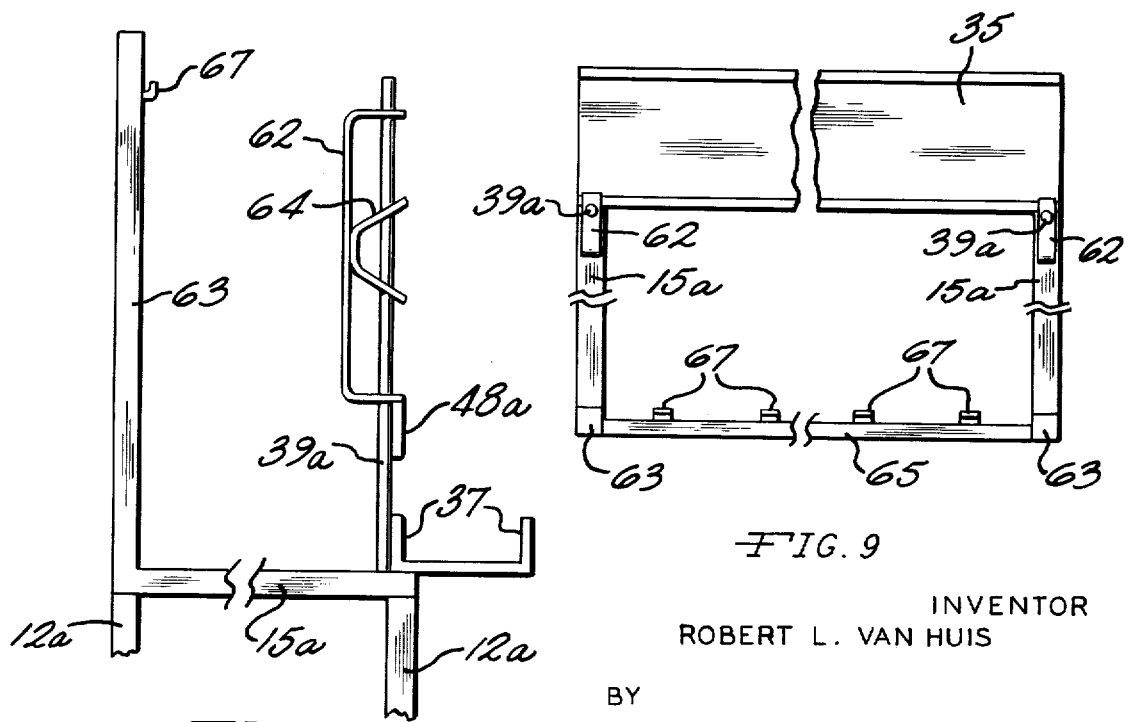

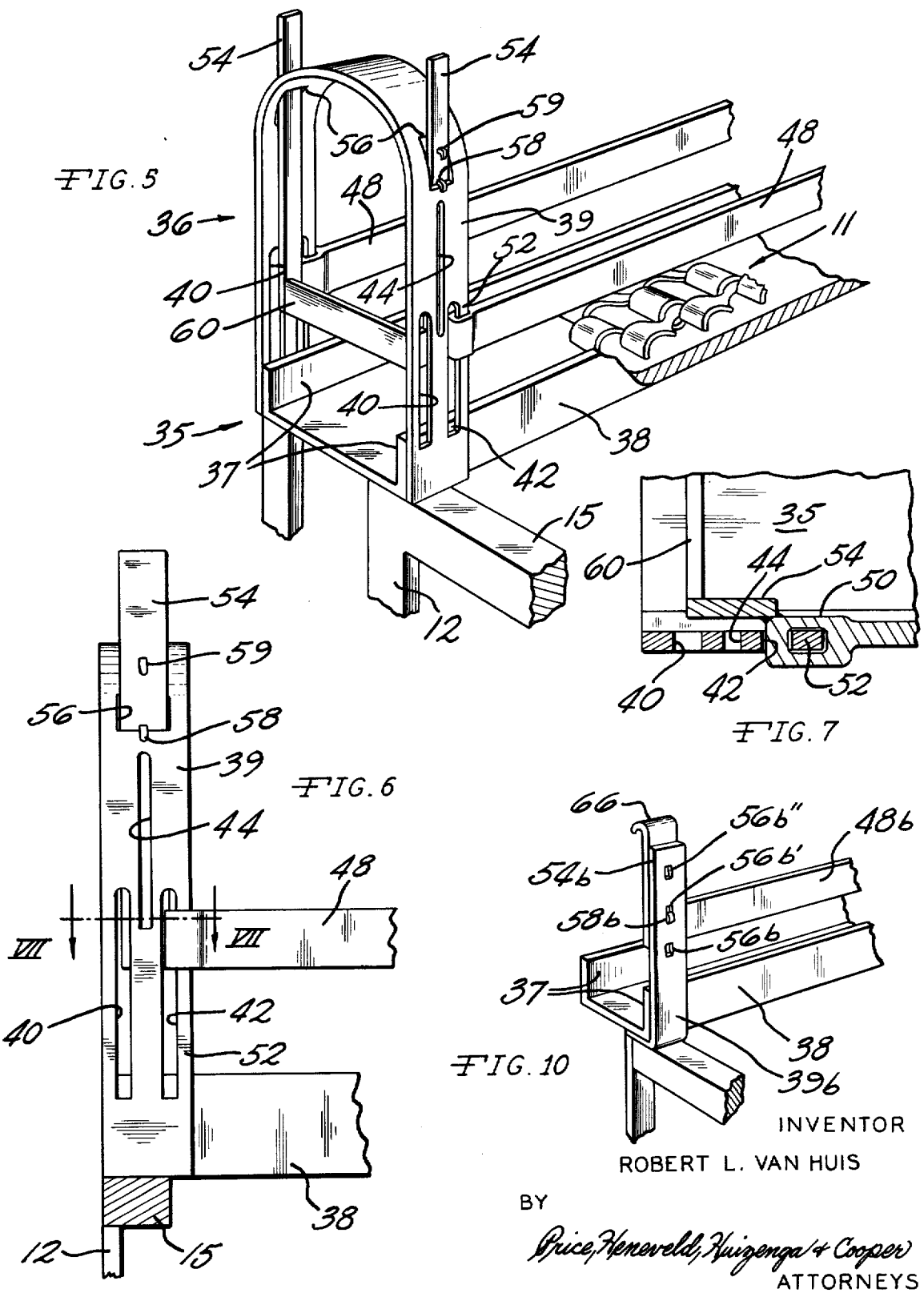

3,903,851

1

CONTAINERIZED PRODUCTION OF POULTRY

RELATED APPLICATION

This application is a continuation-in-part of my copending application Ser. No. 786,177, filed Dec. 23, 1968, now U.S. Pat. No. 3,593,689.

BACKGROUND OF THE INVENTION

In the poultry industry at the present time a substantial number of poultry are raised in cages to maturity for use as either broilers or layers. However, a great problem has existed in growing and handling the poultry at various stages of their growth. For example, although some complicated cages have been devised for growing poultry from chick to maturity, a majority of poultry is still raised in barns from chicks to a small bird. Then they are moved as small birds to cages and raised to maturity. The layers are then moved to still other cages in which they produce eggs. The broilers are moved to crates and transported to processing plants. In all such cases the original small chick is transported in boxes from which they are required to be moved to the barn or the said complicated cages. In all cases a problem has existed in that the poultry have to be handled several times before they arrive at the place where they ultimately are to be used as either a broiler or a layer. This handling is particularly a problem when one considers large poultry operations involving over 50,000 to 100,000 birds and the requirement that each squirming, fluttering and nervous bird requires careful handling.

SUMMARY OF THE INVENTION

In accordance with this invention, I have conceived a method whereby the amount of handling of poultry from chick to processing plant or layer house is substantially reduced to the handling of the chick at the hatchery and the mature bird at the processing plant. In the case of layers my method requires only the handling of the chick at the hatchery and at the laying house. I have accomplished this reduction in handling by conceiving of the method whereby a cage capable of being transported or shipped without removal of the poultry is provided while at the same time said cage is made capable of allowing complete growth of poultry from chick to maturity. This cage is utilized by first being shipped to the hatchery where the chick is placed in the cage. The chicks are then shipped while in the cages to the grower, where they grow to maturity. At maturity the poultry are shipped while in the same cage to the processor, in the case of broilers, and to a layer house in the case of layers. After the poultry are either processed or expend their useful laying life, the cages are sent back to the hatchery to repeat the above said steps.

Preferably this method utilizes a novel cage removably mounted and supported by a cage stand, which cage will allow the complete growth of poultry and the shipment of the same without removal of the poultry from this cage, thus providing a containerized production of the poultry. The cage which allows the chick to be retained is designed to allow the size of the mesh at the feeding side of the cage to be enlarged as the bird gets larger so as to continue the ability of the bird to reach the feed. One construction for accomplishing this involves a cage with adjacent wire mesh sides, one of which has openings with a width considerably less than

2 that of the width of the other side so as to allow the chick to eat without getting out of the cage as would happen if the larger openings of the other adjacent side were used.

Because the cages must be shipped containing the birds therein, I have provided on the cage stand means for readily removing the cages. Thus, during certain stages of the processing of the birds the stand must be capable of standing without support from the cages, and I have so constructed it. Although cage stands have been constructed, in the past to be independent from the cages for support, such as, for example, U.S. Pat. No. 3,274,972, these stands have not been designed to readily remove the cage once the cages are installed. The cages in said Pat. No. 3,274,972 cannot be removed without dismantling some of the stand.

Because the bird stays in the same cage for its entire life, provision must be made for adjusting the size of the feeding trough. Accordingly, I have developed as part of the cage stand and independent of the cages, a barrier means that cooperates with the feed trough to enable it to be enlarged, the barrier means being supported with the trough on a frame separate from the cage of the invention. This adjustable barrier means was first described and claimed in my aforesaid application.

Accordingly, it is an object of the invention to provide a method of growing and processing poultry wherein the physical handling of the birds is greatly reduced.

It is an additional object of this invention to provide a cage capable of both accommodating poultry through their entire growth and of being shipped with or without poultry without damaging the cage.

It is a further object to provide a cage of the above character which allows the size of the openings on the feeding side of the cage to be altered without the cage being affected by rough handling such as would occur in shipping.

It is still another object to provide a cage of the above character that is a simple shape and size for shipping.

It is a related object to provide a cage of the above character which is inexpensive to manufacture.

It is still another related object to provide a feed trough for use with the above cage which is adjustable in size.

Other objects and advantages of the invention will become apparent upon reference to the following drawings and detailed discussion.

BRIEF DESCRIPTION OF THE DRAWINGS

FIG. 1 is a partially fragmented perspective view of the cage;

FIG. 2 is a partial perspective view similar to FIG. 1 except that the cage has been rotated 90° and occupies the position for the feeding of the birds when they are more fully grown;

FIG. 3 is an end elevation, partly schematic, illustrating the use of the cage and the feed trough of my invention in conjunction with feeding and watering means;

FIG. 4 is a schematic view illustrating the process of containerized production of poultry which is now available due to the use of my cage;

FIG. 5 is a fragmentary perspective view, partially broken away, of the feed stand utilizing the feed trough side walls extension of the invention;

FIG. 6 is a fragmentary sectional view taken along the line VI—VI of FIG. 3;

FIG. 7 is a fragmentary sectional view taken along the line VII—VII of FIG. 6;

FIG. 8 is an end elevational view illustrating an alternate embodiment of the feed trough side wall extension;

FIG. 9 is a plan view of the embodiment illustrated in FIG. 8;

FIG. 10 is a perspective view illustrating still another embodiment of the feed trough side wall extension; and FIG. 11 is a side elevational view of one row of cages mounted side by side.

DESCRIPTION OF THE PREFERRED EMBODIMENT

Within the broadest aspect of my invention I have provided a method for raising and transporting poultry previous to processing or laying as briefly described above. In order to fully understand and appreciate this broad aspect of my invention I will first describe a novel cage preferably utilized in my method. It should be understood that this cage is utilized in the growth of poultry in any conventional poultry house. Each cage is removably placed on a stand, such as that illustrated by reference numeral 10 (FIG. 3), so that a plurality of cages run along both sides of a feed trough 35 into which feed is conveyed by a conventional chain 11. The stand illustrated in FIG. 3 comprises vertical legs 12 joined to a frame formed by two sets of horizontal bars 13 and 15, by the latter of which the cages are supported. One set of bars 13 and 15 are positioned below both ends of the cage. As discussed below, I have constructed the stand 10 and trough 35 in accordance with the invention so that there are no parts thereof relying upon the cage for support, and so that there are no parts which impede such removal of the cage or requires that the stand and/or trough with their attendant parts be dismantled. It will be noted (FIGS. 1 and 10) that the cages 20 are separate and independent one from the other and therefore are removable separately and independently. Further, as will be described the cages are self supporting and self sustainable thereby not requiring any part of the stand to hold the cage together.

Watering can be accomplished by any device, such as water lines with nipples 14 running alongside thereof. Whatever the device, it can be adjustably mounted either on the mechanism 36 or the cage so that they can be adjusted for watering different sized birds, but preferably on the mechanism 36. As will be described in more detail hereinafter, the feed troughs are made adjustable for different size birds. The droppings of the poultry are conventionally collected in pits 18 under the cages which are periodically cleaned automatically by conventional means.

CAGE

In accordance with one aspect of my invention, the preferred cage which provides the containerized production of the poultry is a rectangulated enclosure 20 having an open wire mesh at least on two adjacent sides, preferably formed by wire rods 22, 24, 26 and 28 or the like that are mutually interconnected such as by welding, and having corner braces 21. The cage illustrated as an example utilizes wire mesh on all sides.

To provide for the continued feeding and watering of a bird as it grows older, the opening of the mesh is specially constructed on two adjacent sides so that a baby chick can reach the feed trough 35 (which will be described in more detail hereinafter) and the watering stations 14 which run alongside of the cage (FIG. 3) without getting out of the cage, and as a grown bird can reach the same feed trough and watering stations through the larger openings when the cage is rotated 90°. Specifically, the vertical ribs 22 (FIG. 1) are spaced apart at a considerably less distance than are the ribs 24 on the top, so as to provide a feeding opening for the baby chicks having a width considerably less than that of the opening formed by ribs 24. The exact dimensions can vary depending upon the size of the poultry which are grown in the cage, but the width formed by the ribs 22 should in no case be less than seven-eighths inch and in no case be as large as the width of the opening formed by the ribs 24 which in turn should not exceed 2 inches. Also, the age of the poultry at which the cage is rotated 90° so as to bring the ribs 24 down into a vertical position facing the feed trough 12 (FIG. 3) obviously depends on the particular poultry being grown, the only requirement being that the bird be too large to get out through the ribs 24.

CAGE SUPPORTS

Inasmuch as the cage is rotated 90° and otherwise must be readily removable, I have constructed the feed trough and its related structure so that it is mounted independently of the cage. Because small chicks need a shallow trough while big birds need a deep one to prevent the scattering of feed, it is necessary that the trough size be adjustable also. Accordingly, I have fixed the trough 35 to the frame, and to allow the trough side walls 37 to be increased in height, I provide a mechanism 36 mounted on the frame. The mechanism 36 is mounted, for example as illustrated in FIGS. 5 and 6, on the outside surface 38 of the side walls 37, this embodiment utilizing a vertically extending bar 39 which is bent in the shape of a U so as to bridge and attach to both side walls 37. The bent bar 39 has three pairs of perforations or cutouts 40, 42 and 44, hereinafter explained. A barrier plate 48 is provided for positioning above each side wall 37, the plate having an end 50 wrapped around the leg 52 of the bar 39 formed by the perforation 42, to allow the barrier plate to be slid up and down with respect to the vertical bar 39. The perforation or cutout 40 adjacent to the perforation 42 is utilized in the same fashion for a similar barrier if another cage is placed adjacent to the end of the cage 20 illustrated in FIG. 3. To hold both the barrier plates in a fixed vertical relation or position with respect to the side wall 37 of the trough, a vertical bar 54 is welded to both ends of each barrier plate. To allow both vertical bars 54 to extend up through the U-shaped vertical bar 39, the latter is formed with still another pair of cutouts 56. To hold its barrier plate 48 approximately 2 inches above the top edge of the side wall 37, the vertical bar 54 is provided with a tab 58. The barrier plate occupies this position when the baby chicks have reached an age where they cannot escape out through the long dimension of the opening formed by the wires 22 and 30, namely the vertical dimension. Prior to that age, the barrier plate is lowered so that the bottom edge of the plate is only seven-eighths inch above the tab 58. In this position the plate 48 acts as a barrier to prevent the chick from escaping out through the long dimension of the opening formed by the rods 22 and 30. When the vertical bar is so positioned with the tab 59 resting on the bottom edge of the cutout 56 to obtain the 7/8 inch spacing of the barrier plate from the side wall 37, the tab 58 projects into the cutout 44, the cutout 44 having the sole purpose of accommodating the tabs 58 and 59 when they are not being utilized to hold the barrier plate up. The final positioning of the barrier plate is accomplished by lowering it until it rests on the top edge of the side wall, this being done when the chicks reach the age at which the cage is to be rotated in the manner described above. The barrier plate 48 thus acts, in this position, as a wall extension for the side wall 37, which extension serves both to hold more food for the larger birds and to prevent the larger birds from flipping with their beaks the feed over the sides of the trough.

To connect the two barrier plates 48 and their vertically extending bars 54 together so that both sides of the trough have the barrier plates the same distance above the side walls, an end plate 60 is welded to the two vertically extending bars 54. It will be readily apparent that in the event it is desired that the spacing of the barrier plates on the two sides of the trough not be the same, the end plate 60 can be eliminated. FIGS. 8 and 9 illustrate alternate embodiments for the mechanism supporting the barrier plate. The parts in these embodiments which correspond to those previously described have the same reference numerals to which the distinguishing suffixes $a$ and $b$ have been added. Thus, in FIG. 8 the stand 10$a$ comprises legs 12$a$ and a horizontal support bar 15$a$. A vertically extending rod 39$a$ is welded to the outside surface of the side walls 37. Or it can be fixed to the frame on the bar 15$a$. The barrier plate 48$a$ is welded to a C-shaped element 62 perforated at both ends to slide up and down over the rod 39$a$. To clamp the element 62 and the barrier plate 48$a$ in any desired position, a spring clamp 64 is welded to the element 62 and is provided with perforations through which passes the rod 39$a$. It will be readily apparent that the rod 39$a$ need not be cylindrical but can be a bar strip as well, the perforations in the element 62 and the clamp 64 being modified accordingly. The embodiment illustrated in FIGS. 8 and 9 includes an illustration of an additional modification in the support of the cages. A vertical support bar 63 is fixed to each of the two bars 15$a$, the bar being positioned in back of the cage when the latter is installed. A hook bar 65 extends from and is attached to both of the bars 63 to engage one of the rods forming the wire mesh of the cage, hooks 67 are positioned along the bar 65. To rotate or remove the cage, it is merely lifted up to disengage the hooks from the cage. It will be readily apparent that other forms of support for the "back" of the cage are possible, provided that the cage can be readily removed therefrom such as by lifting it.

In the embodiment illustrated in FIG. 10, the vertically extending bar 39$b$ mounted on support bar 15$b$ is provided with three sets of openings or perforations 56$b$, these being distinguished vertically by a prime for the middle opening or perforation, as 56$b'$, and a double prime for the topmost opening, as 56$b''$. To hold the barrier plate 48$b$ in a fixed vertical position above the side wall 37, a barrier plate vertical bar 54$b$ is welded to the plate and has a lanced tab 58$b$ cooperatively shaped to extend through any of the openings or perforations 56$b$. To assist in lifting the barrier plate so that the tab 58$b$ is lifted out of the openings 56$b$, a curved handle 66 is formed on the bar 54$b$. Thus, if the barrier plate 48$b$ is to sit on top of the top edge of the side wall 37, the tab 58$b$ is inserted into the lowermost opening 56$b$. If the spacing between the bottom edge of the barrier plate 48$b$ and the top edge of the side wall 37 is to be seven-eighths inch, the tab is inserted in the middle opening 56$b'$. Finally, if the spacing desired between the bottom edge of the barrier plate and the top edge of the side wall is 2 inches, such as for a chick in the intermediate state, the tab 58$b$ is inserted through the opening 56$b''$.

As a specific example of the use of the cage for small and large birds, newly hatched leghorn roosters were placed in a cage occupying the position shown in FIG. 1, the cage being 24 inches long, 14 inches high, and 20 inches wide. Except for the ribs 24 and the ribs 26 which form one feeding side of the cage, the wire rods forming the cage were of gauge 14. The rods forming the ribs 24 and 26 were of gauge 12. The sizes of the openings in the mesh were as follows: for the sides forming the ends 27 of the bottom 28 of the cage (FIG. 2) square openings having a 1 inch dimension were used; for the feeding side defined by vertical ribs 22 and by their cooperating horizontal ribs 30, the openings were 1 inch × 2 inches; for the second feeding side defined by the ribs 24 and 26, the openings were 1½ × 4 inches. The cage was not rotated from the position shown in FIG. 1 to the position shown in FIG. 2 until the chicks had reached the age of two weeks. The number of chicks in a cage of this nature can vary, particularly when different types of chicks are used, but in this instance, twelve chicks per cage was common.

CONTAINERIZED PRODUCTION

In accordance with still another aspect of my invention, the above said cage and cage support allow the practicing of my method forming the broadest aspect of my invention. The cage is taken to a hatchery where one or more newly hatched chicks are placed in the cage through gate 132, for example, formed by 12 gauge wires 133 hinged at 134. The cage containing the chicks is then shipped to a grower who retains the birds within the cage throughout their entire growth during which time the birds are fed and watered in the cage by means of the feed trough 35 and watering devices 14. Initially the barrier 48 is in its intermediate position. As the chicks get larger so that they can not escape through the mesh formed by ribs 22 and 30, the barrier is raised to the uppermost position. When the birds reach the appropriate size, the cage is rotated 90° one time to change the size of the opening for the feeding and the watering, and the barrier plate is lowered into contact with the side walls 37. Specifically, when the chicks have the proper size, namely, the size when they cannot get out between the ribs 24 and 26, the larger openings formed by the ribs 24 and 26 comprising the top of the cage when the chicks are first inserted is rotated into position beside the feeding trough. After the birds are fully grown they are shipped by shipping them in that cage to a processing plant where they are released for processing, and the empty cage is then shipped back to a hatchery for a new batch of poultry, after which the preceding steps are repeated so that the cage goes through a continuous cycle of growth and processing of poultry. In the case of hens, the mature birds are shipped in their cages to a layer house where they spend the remainder of their lives. Thereafter the cages are returned to the hatchery.

Thus, it can be seen that the simplicity of the construction of the cage of my invention is what allows the cage to be shipped so as to obtain the containerized production of the poultry. A more complex construction would suffer the disadvantages of being damaged so as not to be able to accommodate a growing chick. In addition, it is this simple construction which also makes the cage less expensive to construct than would be a complex design.

While the invention has been described in connection with the preferred embodiments, it will be understood that I do not intend to limit the invention to that described. For example, a cage having other than six sides could be used. Therefore, I intend to cover all alternatives, modifications, and equivalents, as may be included within the spirit and scope of the invention as defined by the following claims.

The embodiments of the invention in which an exclusive property or privilege is claimed are defined as follows:

1. The process of containerized production of poultry comprising:
    inserting a newly hatched chick into a cage which is constructed to retain and accommodate birds for feeding and watering from newly hatched chicks of small size to mature birds;
    shipping the chick with said cage to a grower;
    providing feed and water for the chick in said cage;
    conveying feed along the outside of said cage in a trough so as to define a feeding side;
    enlarging the size of the mesh at the feeding side of said cage at at least one stage in the growth of the bird by rotating the cage 90° so as to present at the feeding side a mesh having larger openings, which theretofore had formed the top side of the cage, whereby the bird is able to continue reaching the feed in the trough even though its body has grown too large for the mesh opening prior to the enlargement of the same; and
    retaining the chick in said cage until maturity.

2. The process of containerized production of poultry comprising:
    inserting a newly hatched chick into a cage which is constructed to retain and accommodate birds for feeding and watering from newly hatched chicks of small size to mature birds;
    shipping the chick with said cage to a grower;
    providing feed and water for the chick in said cage;
    conveying feed along the outside of said cage in a trough so as to define a feeding side;
    enlarging the size of the mesh at the feeding side of said cage at at least one stage in the growth of the bird;
    enlarging the size of the trough at the same time that said mesh size is enlarged by lowering from a raised position a barrier until it is positioned on the top of a side of the trough, thus extending the height of that side whereby the bird is able to continue reaching the feed in the trough even though its body has grown too large for the mesh opening prior to the enlargement of the same; and
    retaining the chick in said cage until maturity.

3. The process of containerized production of poultry comprising:
    inserting a newly hatched chick into a cage which is constructed to retain and accommodate birds for feeding and watering from newly hatched chicks of small size to mature birds;
    shipping the chick with said cage to a grower;
    providing feed and water for the chick in said cage;
    conveying feed along the outside of said cage in a trough so as to define a feeding side;
    enlarging the size of the mesh at the feeding side of said cage at at least one stage in the growth of the bird;
    raising said barrier to clear said closest opening when said chicks are older whereby the bird is able to continue reaching the feed in the trough even though its body has grown too large for the mesh opening prior to the enlargment of the same; and
    retaining the chick in said cage until maturity.

4. The process as defined in claim 3 and further including as a later step the step of lowering said barrier until it is positioned on the top of a side of the trough, thus extending the height of that side.

5. The use of a cage, which is constructed to retain and accommodate birds for feeding and watering from newly hatched chicks of small size to mature birds, having two different sized mesh openings for feeding and watering on two different sides of the cage, the use comprising:
    taking the cage to a hatchery;
    placing a newly hatched chick therein;
    shipping the cage containing the chick to a grower;
    providing feed and water for the chick in said cage;
    retaining the bird within that cage throughout its entire growth, during which time the cage is rotated once to change the size of the opening for feeding and watering;
    shipping the cage containing the fully grown bird to a processing plant where the bird is released for processing;
    shipping the cage again to a hatchery; and
    repeating the previous steps in a continuous cycle of growth and processing of poultry.

6. The use of a cage as defined in claim 5 wherein said step of rotating is accomplished by rotating the cage 90°.

7. The use of a cage as defined in claim 6 wherein more than one newly hatched chick is placed in the cage at the same time.

8. The process of containerized production of poultry comprising:
    providing a cage which is constructed to retain and accomodate birds for feeding and watering from newly hatched chicks of small size to mature birds, said cage having a plurality of sides, at least one side of said cage being positioned during normal stationary use in close proximity to feed and water means and presenting openings through which newly hatched chicks can extend their head and necks for feeding but of sufficiently small size to restrain the chicks from leaving the cage;
    inserting newly hatched chicks into said cage;
    shipping the chicks with said cage to a grower;
    watering said chicks by providing a source for water readily available to the chicks;
    feeding said chicks by conveying feed along the outside of said cage in a trough immediately adjacent said cage; and changing the size of the openings which are presented to the chicken during normal stationary use without destroying the use of said cage for subsequent use in retaining newly hatched chicks therein, said change being made during at least one stage in the growth of the bird, whereby the bird is able to continue reaching the feed in the trough even though it has grown too large for the original openings.

* * * * *